United States Patent
Hamada et al.

(10) Patent No.: US 8,004,712 B2
(45) Date of Patent: Aug. 23, 2011

(54) IMAGE PROCESSING APPARATUS AND METHOD

(75) Inventors: Noboru Hamada, Kawasaki (JP); Masakazu Kitora, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1114 days.

(21) Appl. No.: 11/275,826

(22) Filed: Jan. 31, 2006

(65) Prior Publication Data

US 2006/0170952 A1    Aug. 3, 2006

(30) Foreign Application Priority Data

Jan. 31, 2005  (JP) .................................. 2005-023936

(51) Int. Cl.
   *G06K 15/00*  (2006.01)
(52) U.S. Cl. ........ 358/1.18; 358/453; 358/462; 382/177
(58) Field of Classification Search ................. 358/1.14, 358/1.15, 1.16, 1.17, 1.18, 462, 453; 382/175, 382/176, 177, 180, 181
   See application file for complete search history.

(56) References Cited

U.S. PATENT DOCUMENTS

| | | | |
|---|---|---|---|
| 5,671,277 A | 9/1997 | Ikenoue et al. ................... 380/7 |
| 5,821,929 A | 10/1998 | Shimizu et al. | |
| 5,867,597 A * | 2/1999 | Peairs et al. .................. 382/209 |
| 5,918,988 A * | 7/1999 | H.A.M. Van Oijen .......... 400/76 |
| 6,243,541 B1 * | 6/2001 | Shimizu .......................... 399/17 |
| 6,559,968 B1 * | 5/2003 | Keronen ....................... 358/1.18 |
| 7,339,691 B2 * | 3/2008 | Ferlitsch ....................... 358/1.15 |
| 7,475,061 B2 * | 1/2009 | Bargeron et al. ................. 707/3 |
| 2001/0042083 A1 * | 11/2001 | Saito et al. .................... 707/517 |
| 2005/0105148 A1 * | 5/2005 | Misawa ........................ 358/537 |
| 2005/0146750 A1 * | 7/2005 | Moroney et al. ............. 358/1.18 |
| 2006/0114484 A1 | 6/2006 | Kitora .......................... 358/1.13 |

FOREIGN PATENT DOCUMENTS

| | | |
|---|---|---|
| JP | 06-020027 | 1/1994 |
| JP | 8166959 A | 6/1996 |
| JP | 2004320815 A | 11/2004 |

OTHER PUBLICATIONS

Japanese Office Action dated Jun. 12, 2009 in corresponding Japanese Application No. 2005-023936.
Office Action issued on Sep. 14, 2009 concerning Japanese Patent Application No. 2005-023936.
Explanation of Japanese Patent Laid-Open 2004-320815, which was previously cited in an Information Disclosure Statement dated Aug. 19, 2009.

* cited by examiner

*Primary Examiner* — Kent Yip
(74) *Attorney, Agent, or Firm* — Fitzpatrick, Cella, Harper & Scinto (57) ABSTRACT

It is desired that only necessary document pages be picked up from an enormous quantity of documents and copied by controlling copying operation on the basis of information designated by a user. For this purpose, a plurality of images are input, each image is segmented into objects, and an object as a search key is set. It is then determined, with respect to each of the plurality of images, whether the objects segmented from the image includes the object as the search key. Images containing the object as the search key are selectively copied out of the plurality of images.

8 Claims, 11 Drawing Sheets

IMAGE PROCESSING APPARATUS AND METHOD

FIELD OF THE INVENTION

The present invention relates to an image processing apparatus and method and, more particularly, to image processing of outputting necessary images out of a plurality of images.

BACKGROUND OF THE INVENTION

Recently, with advances in optical character recognition (OCR) techniques and increases in the number of functions of multi-functional peripheral equipment (MFP), e.g., vectorization of image data, data recorded as images on paper sheets and electronic data have been able to be used seamlessly. Under such a technical background, demands have arisen for a function of automatically picking up only necessary document papers out of an enormous quantity of documents and copying them. In order to meet such a requirement, a technique is disclosed in Japanese Patent Laid-Open No. 6-20027, in which additional information embedded in each document image is read, necessary document pages are selected on the basis of the read additional information, and the selected pages are copied.

The selecting operation disclosed in Japanese Patent Laid-Open No. 6-20027 is performed with respect to only predetermined specific additional information. However, there has been disclosed no method of performing copy control on the basis of information designated by a user. In other words, it is desired that copying operation be controlled on the basis of information designated by a user to pick up and copy only necessary document paper out of an enormous quantity documents.

Alternatively, when many document pages are copied, it is desired that desired document copies be easily found.

SUMMARY OF THE INVENTION

According to the first aspect of the present invention, an image processing apparatus comprising an input section, arranged to input a plurality of images; a segmentation section, arranged to segment the image input by the input section into objects; a setter, arranged to set an object as a search key from the objects segmented by the segmentation section; a determiner, arranged to determine, with respect to each of the plurality of images, whether the objects segmented from the image include an object corresponding to the object as the search key; and an output section, arranged to selectively output an image containing the object as the search key from the plurality of images in accordance with the determiner, is disclosed.

According to the second aspect of the present invention, an image processing apparatus comprising an input section, arranged to input a plurality of images; a segmentation section, arranged to segment the image input by the input section into objects; a setter, arranged to set an object as a first search key and an object as a second search key from the objects segmented by the segmentation section; a determiner, arranged to determine, with respect to each of the plurality of images, whether the objects segmented from the image include the objects as the first search key and the second search key, set a flag assigned to a memory if it is determined that the objects include the objects as the first search key and the second search key; and an output section, arranged to output the image determined by the determiner while the flag is set, is disclosed.

According to the third aspect of the present invention, an image processing apparatus comprising an input section, arranged to input a plurality of images; a segmentation section, arranged to segment the image input by the input section into objects; a setter, arranged to set an object as a search key from the objects segmented by the segmentation section; a determiner, arranged to determine, with respect to each of the plurality of images, whether the objects segmented from the image include an object corresponding to the object as the search key; and an output section, arranged to output an image determined by the determiner as an image containing the object as the search key upon designating specialty paper, is disclosed.

According to the fourth aspect of the present invention, an image processing apparatus comprising an input section, arranged to input a plurality of images; a segmentation section, arranged to segment the image input by the input section into objects; a setter, arranged to set an object as a first search key and an object as a second search key from the objects segmented by the segmentation section; a determiner, arranged to determine, with respect to each of the plurality of images, whether the objects segmented from the image include an object corresponding to the object as the first search key; a combiner, arranged to extract information associated with the object as the second search key from an image determined by the determiner as an image containing the object as the first search key and combine the information with the image; and an output section, arranged to output the image combined by the combiner if the determiner determines that the image contains the object as the first search key, is disclosed.

According to the present invention, images can be selectively output out of a plurality of images. In addition, the present invention can facilitate selection of desired document copies.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Image processing according to each embodiment of the present invention will be described in detail below with reference to the accompanying drawing.

First Embodiment

[Outline of Copying Operation]

Figure 1:
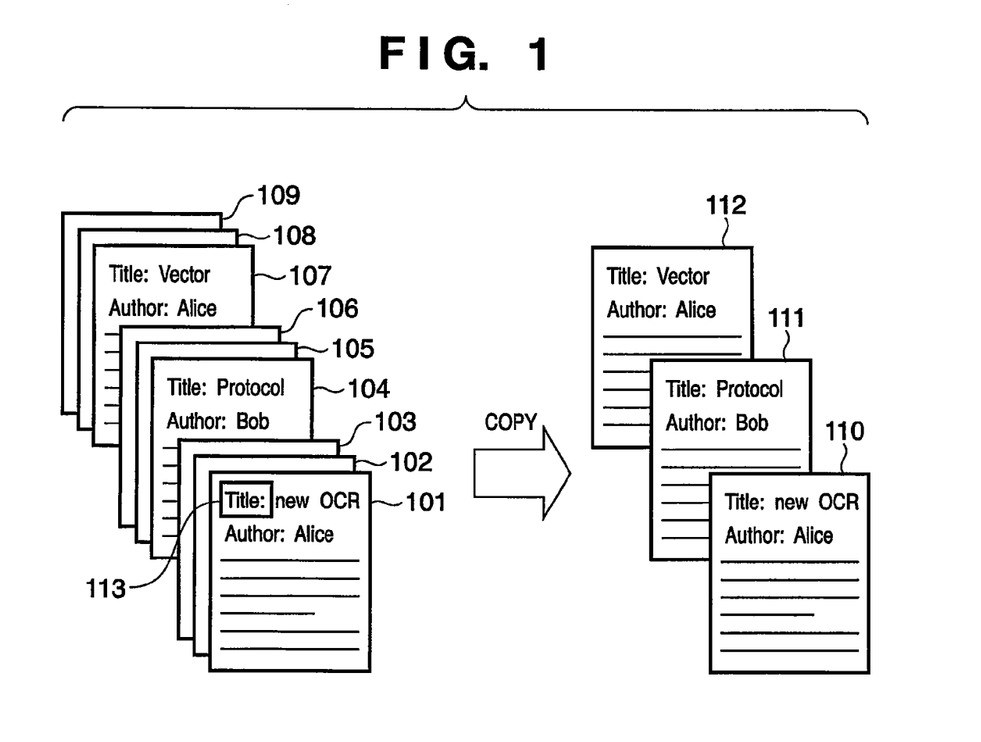
FIG. 1 is a view schematically showing a result of selective copy in the first embodiment.

FIG. 1 is a view schematically showing a result of copying operation using MFP which executes image processing to be described below.

When "Title:" 113 is designated as a key object by operating the operation panel of the MFP or the like and copying operation is performed with respect to document pages 101 to 109 as copy sources, document pages, of the document pages 101 to 109, which contain the designated key object are copied. As a result of this copying operation, copies 110, 111, and 112 of the document pages 101, 104, and 107 are obtained. Obviously, the remaining document pages are not copied.

Image processing performed by the MFP which performs the above copying operation (to be referred to as selective copy hereinafter) will be described in detail below.

[MFP]

Figure 2:
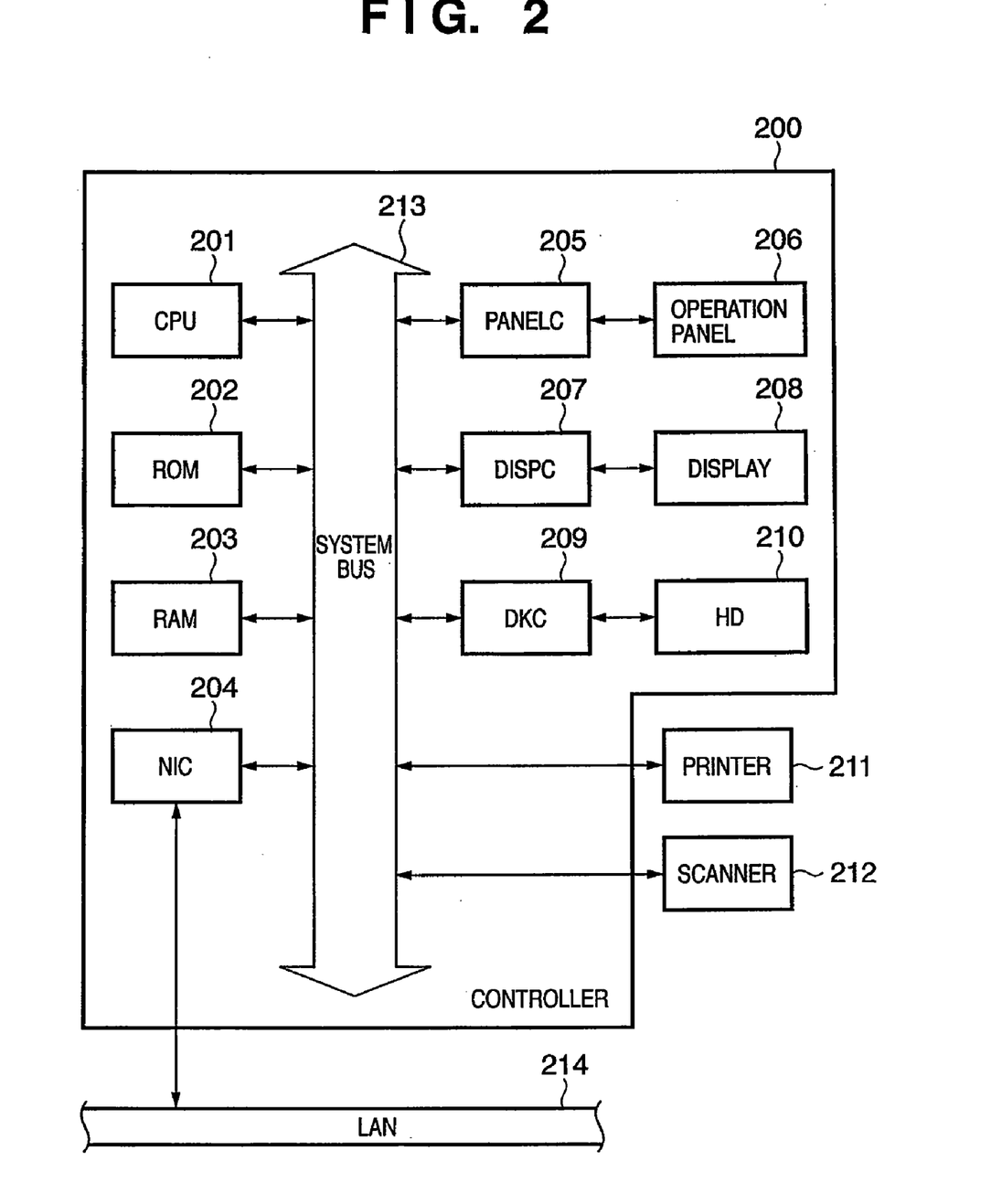
FIG. 2 is a block diagram showing the arrangement of a controller for MFP.

FIG. 2 is a block diagram showing the arrangement of a controller 200 of the MFP.

The controller 200 includes a CPU 201 which executes software stored in a ROM 202 or a large-capacity storage device (HD) 210 such as a hard disk. The CPU 201 systematically controls the respective devices or the control sections of the devices through a system bus 213 by using a RAM 203 as a work memory.

An external input controller (PANELC) 205 receives instructions and inputs from various kinds of buttons provided on an operation panel 206 of the MFP, a touch panel, and the like, and supplies the received instructions and inputs to the CPU 201. A display controller (DISPC) 207 controls the display operation of a display 208 comprising, for example, a liquid crystal panel, under the control of the CPU 201. A disk controller (DKC) 209 controls the read/write operation of the HD 210, which is also used as a temporary storage area for image data, under the control of the CPU 201.

A network interface card (NIC) 204 communicates with another network device, a file server, or the like through a local area network (LAN) 214 under the control of the CPU 201, thereby exchanging data in two ways.

A printer 211 is the printer section of the MFP which prints images on print sheets by a printing method such as an electrophotographic system or an inkjet system under the control of the CPU 201. A scanner 212 is the scanner section of the MFP which reads a document image under the control of the CPU 201. In many cases, an auto document feeder (ADF) is provided as an option to allow the MFP to continuously read a plurality of document pages.

The operation of the MFP and image processing will be described below. The operation and the image processing are executed by the CPU 201, which executes programs stored in the ROM 202 or the HD 210. In this case, the RAM 203 is used as a storage area (work area) for various kinds of data, and not only the RAM 203 but also the HD 210 are used as temporary storage areas for document images and printed images read by the scanner 212.

[Designation of Key Object]

Figure 3:
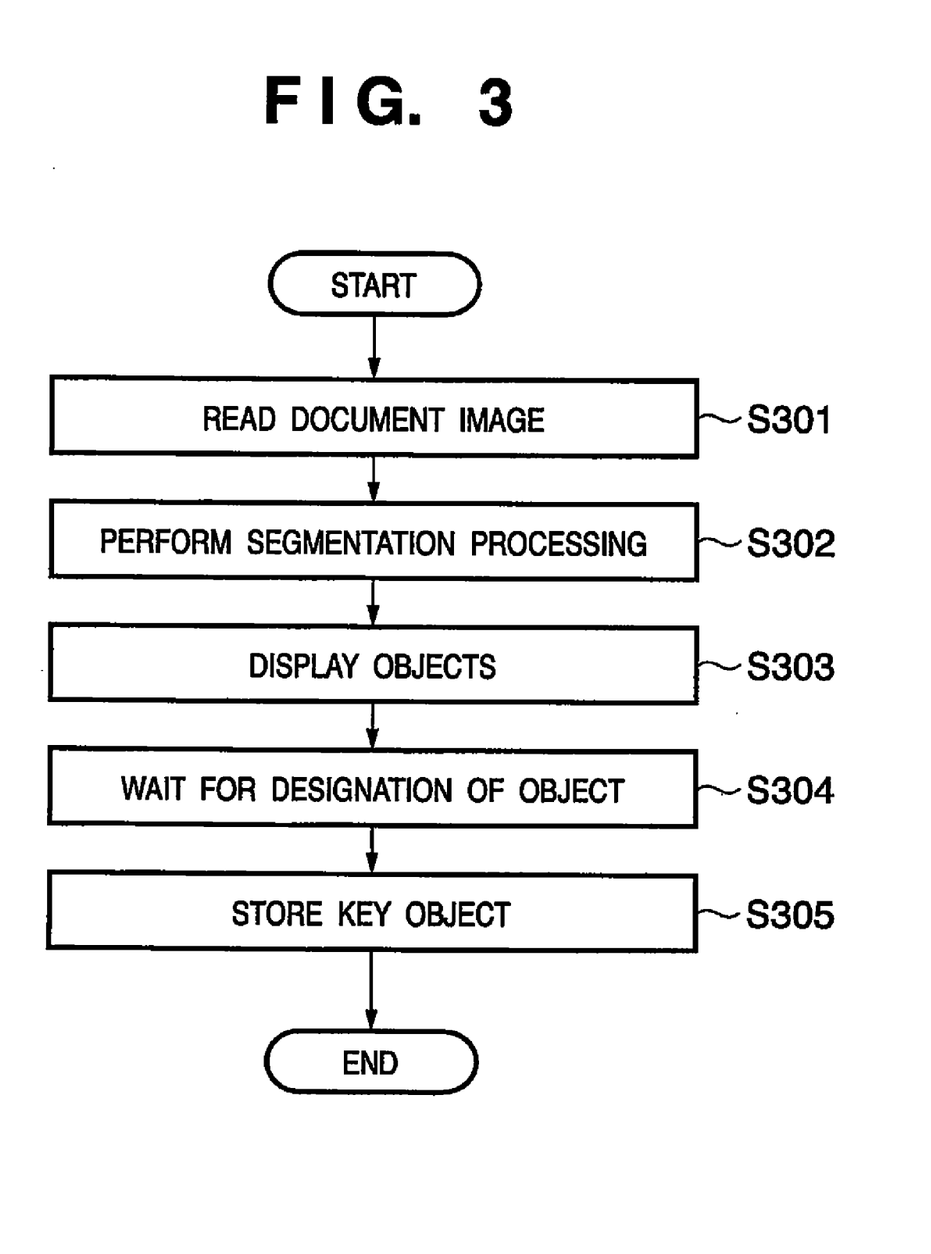
FIG. 3 is a flowchart showing a sequence for designating a key object for controlling selective copy.

FIG. 3 is a flowchart showing a sequence for designating a key object for controlling selective copy. This sequence is executed by the CPU 201 when an instruction to designate a key object is issued from the operation panel 206.

First of all, the scanner 212 is controlled to read a document image and store the read data in the RAM 203 (S301). Subsequently, segmentation processing is performed to segment the document image stored in the RAM 203 into objects (S302).

Figure 4:
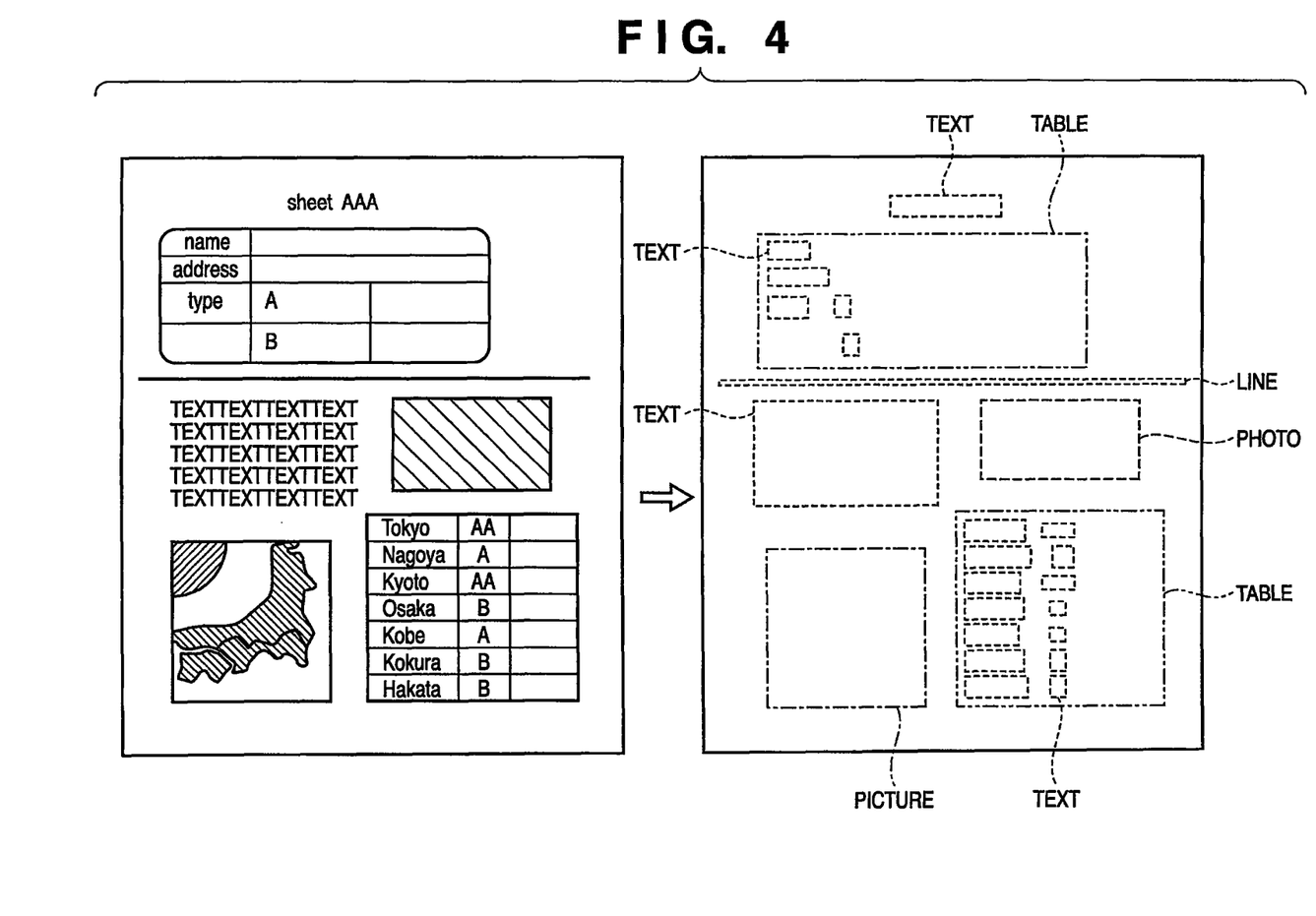
FIG. 4 is a view for explaining region segmentation.

In segmentation processing, first of all, region segmentation like that shown in FIG. 4 is performed. If an extracted block is a text area, character code information is extracted by character recognition. If an extracted block is an image area, vector information is extracted by vector conversion. The region segmentation performs adapted binarization on a document image read from a document, and segments a region having an edge such as the text area and a halftone region having an indistinct edge such as the photo area. Further, the region segmentation detects continuity of the edge of the region having the edge to designate whether the edge constructs a frame of a table or a character. Note that since various methods have been proposed as region segmentation, character recognition, and vector conversion methods, a detailed description thereof will be omitted. The information of each block which is extracted by region segmentation and analyzed in accordance with the characteristics of each block will be referred to as an object.

Subsequently, the DISPC 207 is controlled to display each object segmented by segmentation processing on the display 208. Various display forms are conceivable. For example, as indicated by the right side in FIG. 4, a method of displaying the area information of each block extracted by region segmentation may be used.

Note that the operation window shown in FIG. 4 is an example in which an input image itself is displayed on the left half portion, and rectangular blocks (region segmentation information) as a result of region segmentation are displayed on the right half portion. In order to facilitate understanding of the concept of each rectangular block, the character strings "TEXT", "PICTURE", "LINE", and "TABLE" representing attributes are added to the respective rectangular blocks shown in FIG. 4. In practice, however, no attribute character string is displayed, and the contours of the rectangular blocks are displayed. In other words, contour images corresponding to the segmented objects are displayed. "TEXT" added to a rectangular block represents an object with a character attribute. "PICTURE" represents an object with a graphic pattern attribute. "PHOTO" represents an object with a photo attribute. "LINE" represents an object with a line drawing attribute. "TABLE" represents an object with a table attribute. FIG. 4 shows an example in which an input image and region segmentation information are displayed side by side. However, various display forms can be used. For example, rectangular blocks may be superimposed and displayed on an input image.

The flow then waits until the user performs input operation to designate an object as a key object out of the objects displayed on the display 208. When the user designates an object by operating the touch panel of the operation panel 206 or the like, the designated object is stored as a key object in a predetermined area in the RAM 203. If the key object, that the user wishes to select, is not accurately segmented from the other object, the user selects the object including the key object by using the operation panel 206, and presses a "Detailed Segment" key (not shown in figures) on the operation panel 206. The CPU 201 segments the selected object by changing a threshold value of the adapted binarization or the detection of the continuity of the edge used in step S302, in accordance with the instruction of the user. If necessary, the CPU 201 changes algorithm of the recognition of character in the segmentation. Certainly, the user can select the algorithm used by the CPU 201. The key object, that the user wishes to select, is accurately segmented by the above process.

[Control on Selective Copy]

Figure 5:
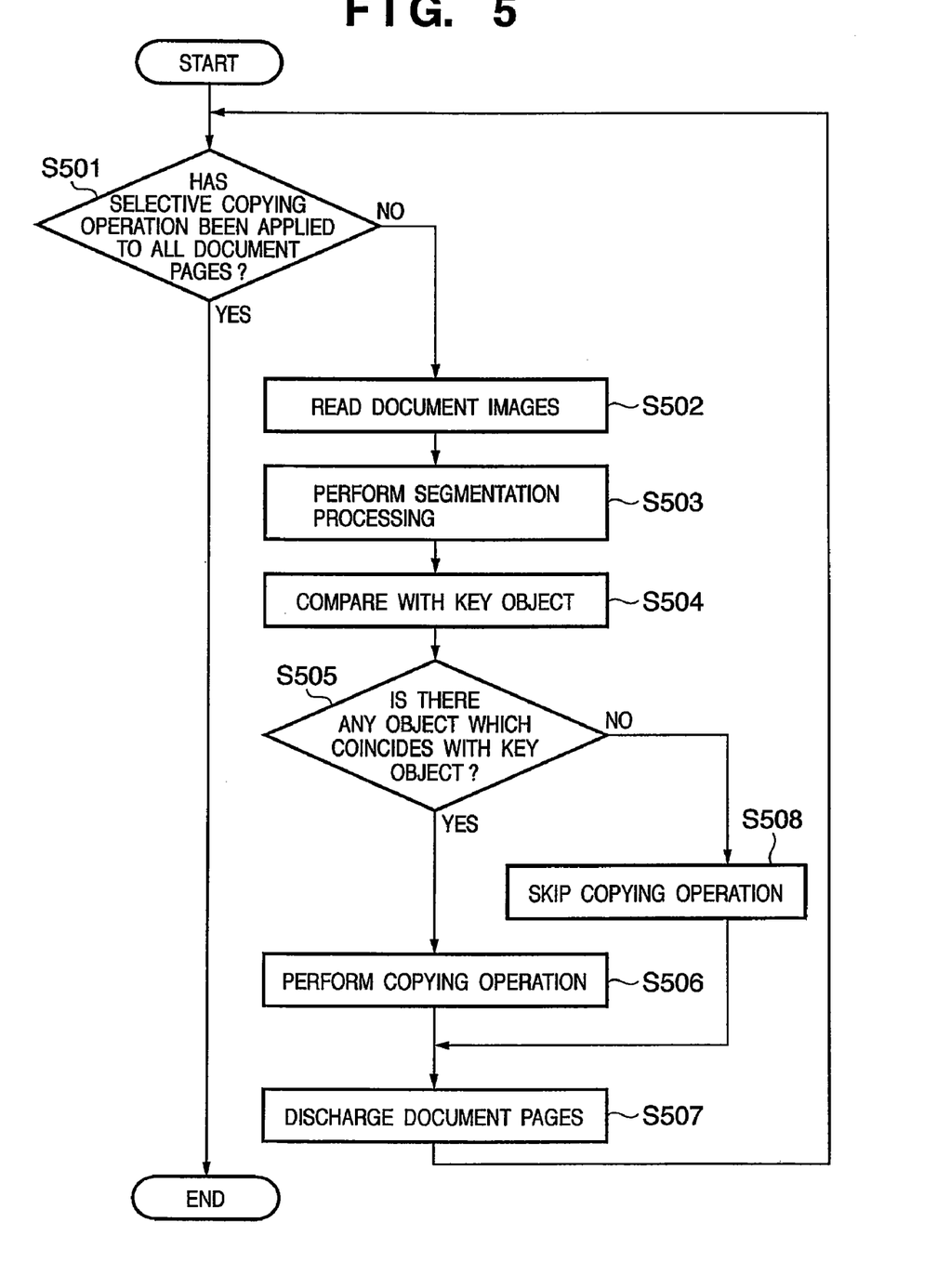
FIG. 5 is a flowchart for explaining selective copy.

FIG. 5 is a flowchart for explaining selective copy, which is executed by the CPU 201 when a key object is designated.

First of all, it is determined whether selective copy has been applied to all the document pages placed on the ADF (S501). If selective copy has been applied to all the document pages, copying operation is terminated. If there is any document page to which selective copy has not been applied, the flow advances to step S502.

If there is any document page to which selective copy has not been applied, the scanner 212 and the ADF are controlled to read one document image, and store the read data in the RAM 203 (S502). The above segmentation processing is performed for the document image stored in the RAM 203 (S503). Each object of the document image is compared with the key object (S504) to determine whether there is any object which coincides with the key object (S505). If the document image contains an object which coincides with the key object, the data of the document image stored in the RAM 203 is sent to the printer 211 to produce a copy of the document image (S506). If the document image contains no object which coincides with the key object, copying operation is skipped (S508). Note that the document image stored in the RAM 203 is erased after copying operation is finished or skipped.

The ADF is then controlled to discharge the document page to which selective copy has been applied from the reading section of the scanner 212 (S507). The flow then returns to step S501.

[Overall Operation of MFP]

Figure 6:
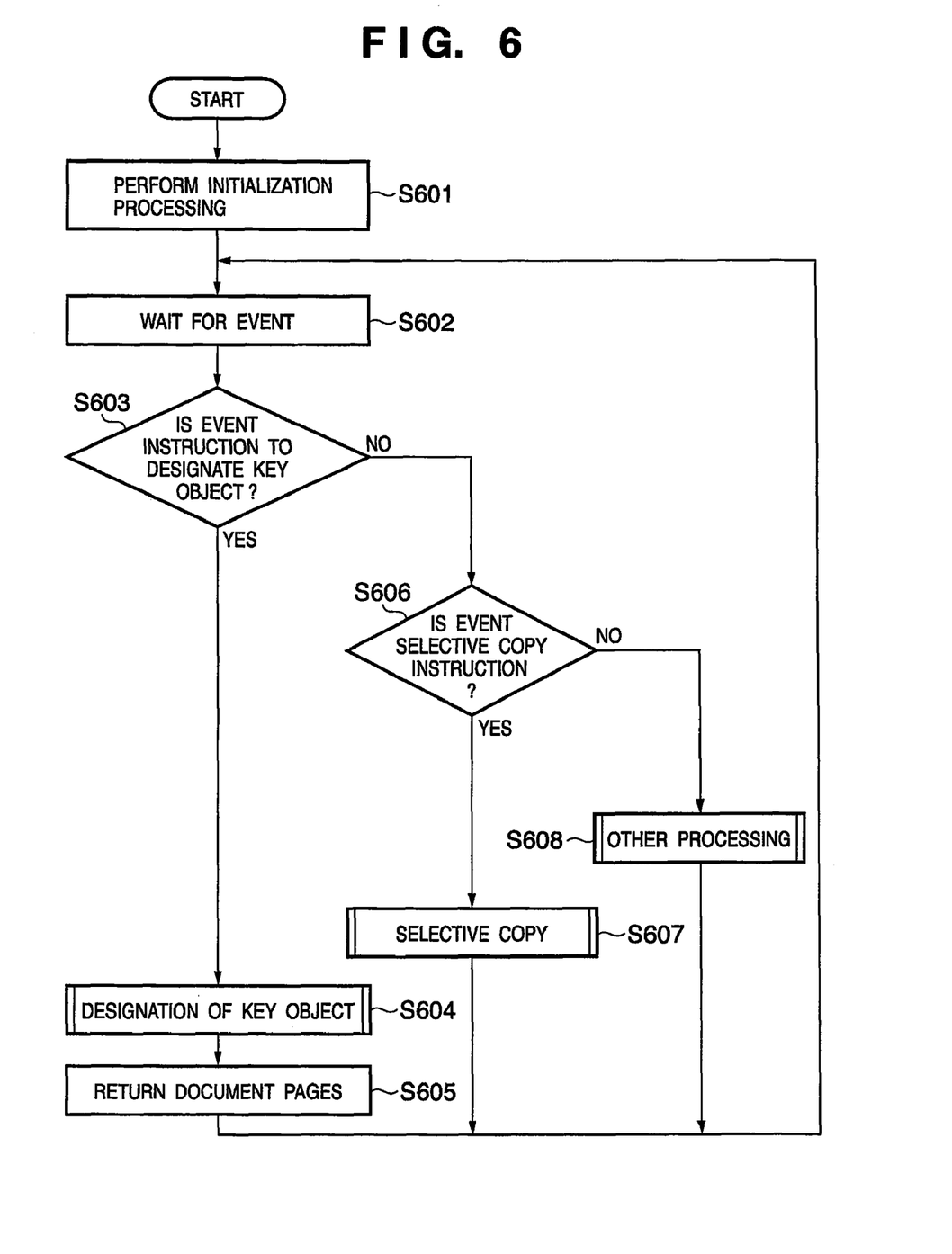
FIG. 6 is a flowchart for explaining the overall operation of the MFP, including key object designating operation and selective copy.

FIG. 6 is a flowchart for explaining the overall operation of the MFP which includes key object designating operation (FIG. 3) and selective copy (FIG. 5).

When the power supply of the controller 200 is turned on or restarted, the CPU 201 performs initialization processing of each section (S601). The flow then waits for an event to receive a processing request through the operation panel 206 or the LAN 214 (S602). More specifically, the CPU 201 controls the PANELC 205 and the NIC 204. When the user issues an instruction or performs input operation by operating the operation panel 206 or a remote control command such as a network print command is received from the LAN 214, the PANELC 205 or the NIC 204 issues an event notification to the CPU 201.

Upon receiving the event notification, the CPU 201 stores the content of the event as a temporary variable in a predetermined area in the RAM 203, and determines whether the event is an instruction to designate a key object (S603). If the event is an instruction to designate a key object, the key object designating operation shown in FIG. 3 is performed (S604). When the key object designating operation is complete, processing of returning the document page from which an image for the key object designating operation is read to the initial position (S605). The flow returns to step S602. The processing of returning the document page to the initial position is the processing of controlling the ADF to feed a document such that the first page of a sheaf of document comprising a plurality of pages becomes the read start page. In other words, this processing is the processing of restoring the sheaf of document to the state before the key object designating operation.

If the event stored in the RAM 203 is other than an instruction to designate a key object, it is determined whether the event is a selective copy instruction after the designation of a key object (S606). If the event is a selective copy instruction, the selective copy shown in FIG. 5 is performed (S607). The flow then returns to step S602.

If the event is neither an instruction to designate a key object nor a selective copy instruction, other processing is performed (S608). The flow then returns to step S602. Note that other processing includes, for example, general copying operation which is not based on the designation of a key object and network printing operation of printing data received from the LAN 214.

Controlling copying operation on the basis of a key object in this manner makes it possible to pick up and copy document pages each containing the object designated by the user out of many document pages.

In the above embodiment, the document image is read in one time when the key object is designated in the flow shown in FIG. 3, and then the document image is reread in the copy operation shown in FIG. 5. The document image read at the designation of the key object and the result of the region segmentation can be stored in the HD 210, thus the selection of the document including the key object can be executed by using the document image and the result of the region segmentation stored in the HD 210. And the image corresponding to the selected document is read from the HD 210, and is printed (or copied) by the printer 211. Therefore, the number of reading of the document becomes one time.

Second Embodiment

Image processing according to the second embodiment of the present invention will be described below. The same reference numerals as in the first embodiment denote the same parts in the second embodiment, and a detailed description thereof will be omitted.

[Outline of Copying Operation]

Figure 7:
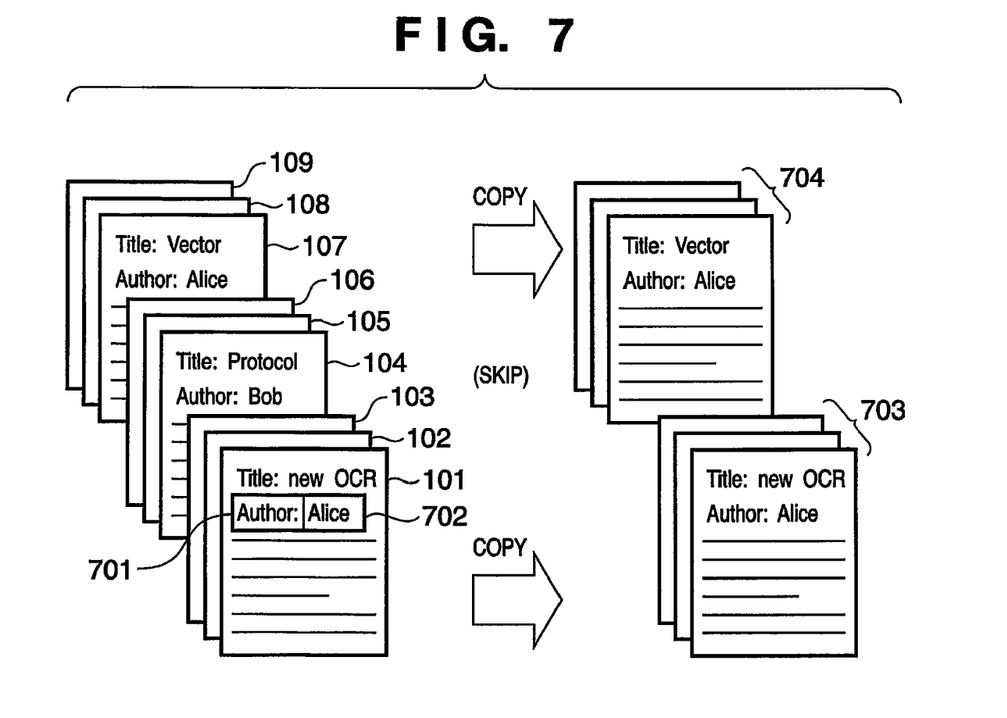
FIG. 7 is a view schematically showing a result of selective copying operation in the second embodiment.

FIG. 7 is a view schematically showing a result of selective copying operation according to the second embodiment.

The user operates an operation panel 206 of MFP or the like to designate "Author:" 701 as the first key object and "Alice" 702 as the second key object, and performs copying operation with respect to document pages 101 to 109 as copy sources. As a consequence, of the document pages 101 to 109, document pages are copied, from a document page containing the designated key objects to a document page immediately before the author's name corresponding to the first key object "Author:" 701 changes to a name other than "Alice". That is, a series of document pages with the author's name "Alice" are copied. As a result of copying operation, a series of document pages 101 to 103 starting from the document page 101 containing the author's name "Alice" and a series of document pages 107 to 109 starting from the document page 107 containing the author's name "Alice" are copied, and copy groups 703 and 704 are obtained. Obviously, series of document pages 104 to 106 starting from the document page 104 with the author's name "Bob" are not copied.

[Control on Selective Copy]

Figure 8:
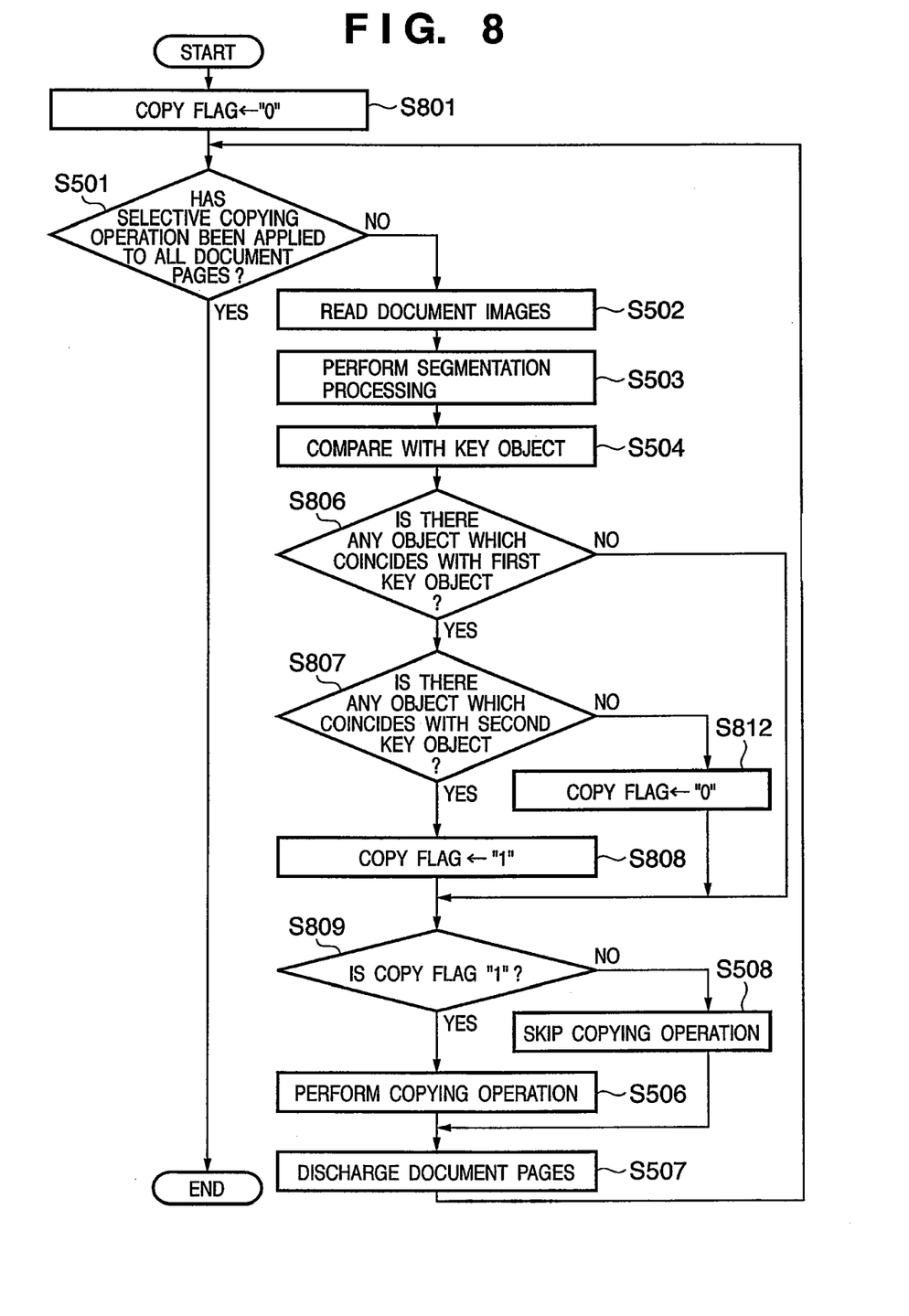
FIG. 8 is a flowchart for explaining selective copy shown in FIG. 7.

FIG. 8 is a flowchart for explaining the selective copy shown in FIG. 7. This processing is executed by a CPU 201 after the designated first and second key objects are stored in a RAM 203. Note that, in FIG. 8, the process attached the same reference numeral as FIG. 5 is the same as the process described in the first embodiment.

First of all, a copy flag as a temporary variable for controlling copying operation is ensured in a predetermined area in the RAM 203, and the value is reset to "0" (S801). It is then determined whether selective copy has been applied to all the document pages placed on the ADF (S501). If selective copy has been applied to all the document pages, the copying operation is terminated. If there is any document page to which selective copy has not been applied, the flow advances to step S502.

Since the processing (S502 to S504, S506 to S508) to be executed when there is any document page to which selective copy has not been applied is the same as the processing shown in FIG. 5, a detailed description thereof will be omitted.

It is then determined whether there is any object which coincides with the first key object ("Author:" in this case) (S806). If the document image contains no object which coincides with the first key object, the flow advances to step S809. If there is an object which coincides with the first key object, it is determined whether there is any object which coincides with the second key object ("Alice" in this case) (S807). If the document image contains an object which coincides with the second key object, the copy flag is set to "1" (S808). If there is no object which coincides with the second key object, the copy flag is reset to "0" (S812).

The copy flag is then determined (S809). If the copy flag is "1", copying operation (S506) is executed. If the copy flag is "0", copying operation is skipped (S508).

As described above, if there is an object which coincides with "Author:" (first key object) and there is an object which coincides with "Alice" (second key object), the copy flag is set, and copying operation (S506) is executed. Since the set state of the copy flag is maintained up to a document page immediately before a document page containing an object which coincides with "Author" and not containing an object which coincides with "Alice", the copying operation (S506) is continued.

By controlling copying operation on the basis of a plurality of key objects in this manner, a series of document pages starting from a document page containing the object designated by the user can be picked up and copied out of many document pages.

The above description has exemplified the case wherein the second key object is designated. For example, however, when authentication is to be performed by operating the operation panel 206 in using the MFP, an individual name or department name as information obtained as a result of authentication can be set as the second key object. This makes it possible to pick up and copy a series of document pages starting from a document page containing an object which coincides with the authenticated individual name or department name out of many document pages.

Third Embodiment

Image processing according to the third embodiment of the present invention will be described below. The same reference numerals as in the first and second embodiments denote the same parts in the third embodiment, and a detailed description thereof will be omitted.

[Outline of Copying Operation]

Figure 9:
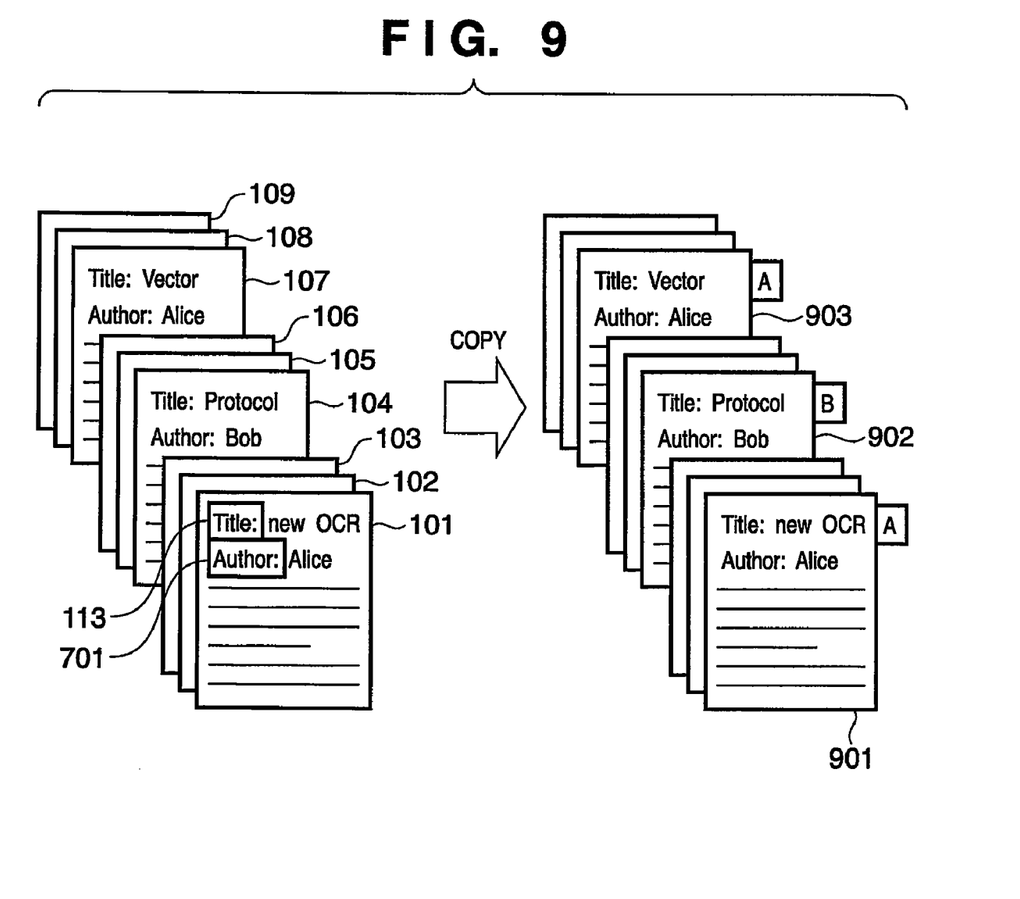
FIG. 9 is a view schematically showing a result of selective copying operation in the third embodiment.

FIG. 9 is a view schematically showing a result of selective copying operation according to the third embodiment.

The user operates an operation panel 206 of MFP to designate "Title:" 113 as the first key object and "Author:" 701 as the second key object. Copying operation is then performed with respect to document pages 101 to 109 as copy sources. As a consequence, all the document pages 101 to 109 are copied. Of these document pages, document pages containing the designated first key object are copied on sheets of specialty paper (to be referred to as tab paper hereinafter) having tabs. For example, one character (the initial of the author's name in this case) following the second key object, excluding a blank character, is printed on a tab. In the case shown in FIG. 9, the initial "A" of "Alice" is printed on the tabs of copies 901 and 903 corresponding to the document pages 101 and 107, and the initial "B" of "Bob" is printed on the tab of a copy 902 corresponding to the document page 104.

[Control on Selective Copy]

Figure 10:
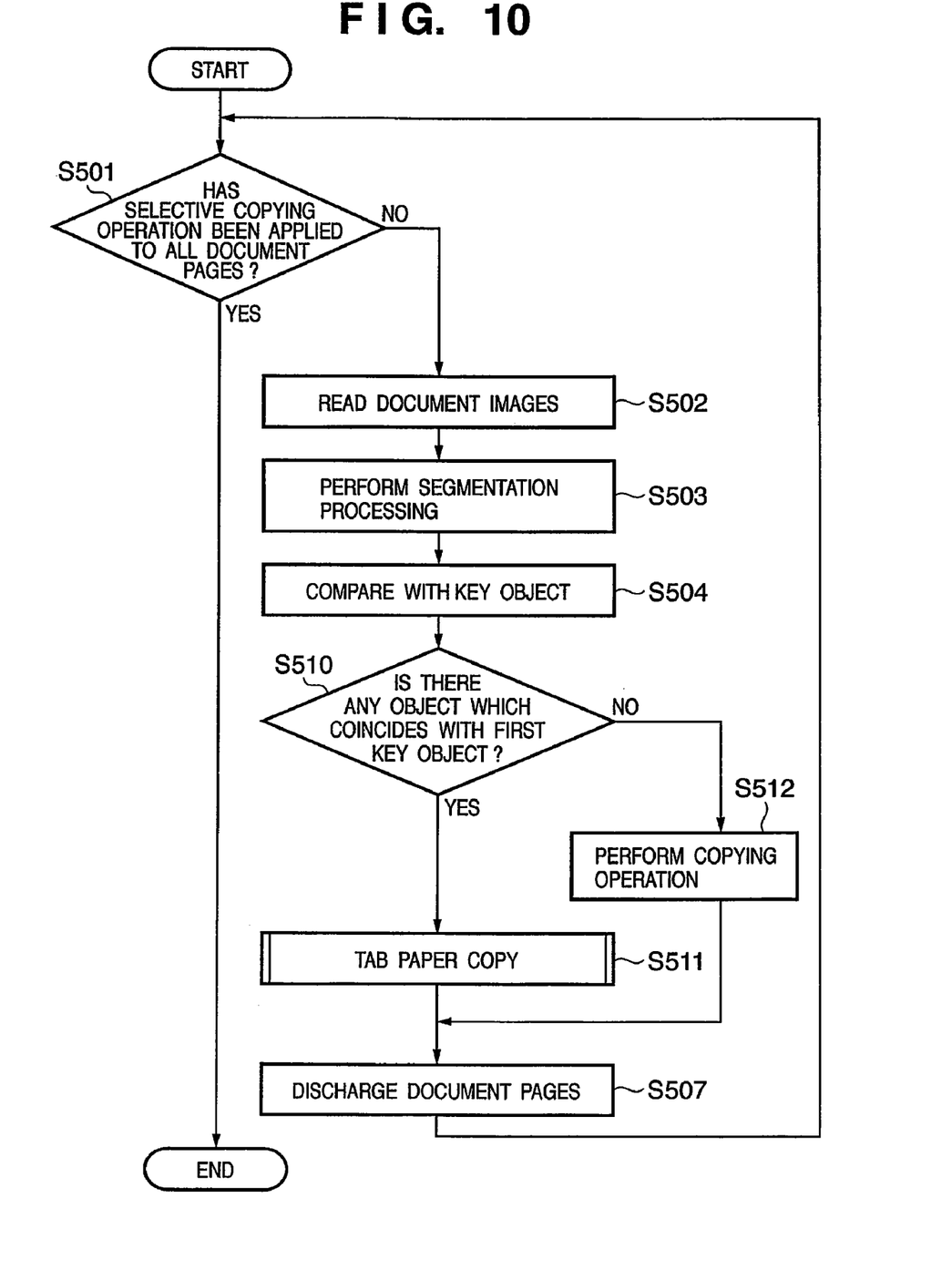
FIG. 10 is a flowchart for explaining selective copy shown in FIG. 9.

FIG. 10 is a flowchart for explaining the selective copy shown in FIG. 9. This processing is executed by the CPU 201 after the designated first and second key objects are stored in a RAM 203.

The processing shown in FIG. 10 differs from that shown in FIG. 5 in steps S510 to S512. That is, it is determined whether a document image contains an object which coincides with the first key object ("Title:" in this case) (S510). If the document page contains such an object, tab paper copy is executed (S511). Otherwise, copying operation is executed (S512).

Figure 11:
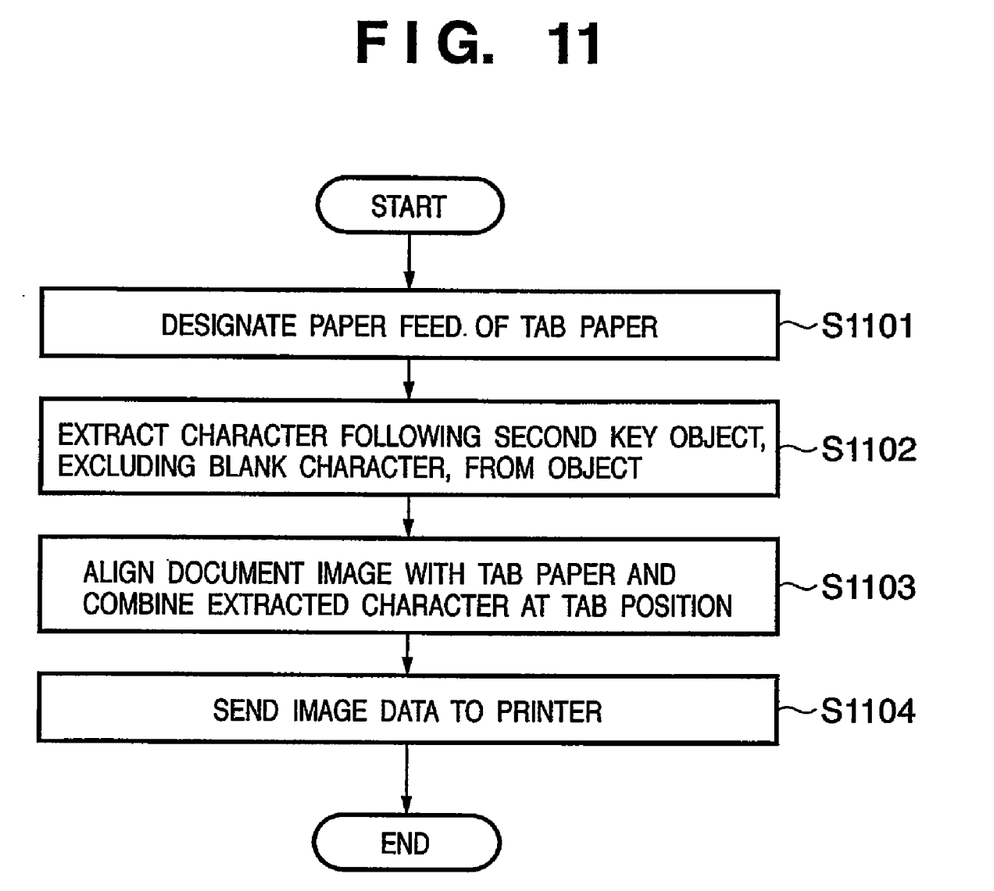
FIG. 11 is a flowchart for explaining the details of tab paper copy.

FIG. 11 is a flowchart for explaining the details of tab paper copy, which corresponds to step S511 in FIG. 10. This processing is also executed by the CPU 201.

First of all, paper feed from a tray or cassette in which sheets of tab paper are stored is designated (S1101). Characters (e.g., one character) following the second key object, excluding a blank character, are extracted from an object (S1102). Subsequently, the document image data stored in the RAM 203 is processed in accordance with tab paper to combine the extracted character at the tab position (S1103). The combined image data is then sent to a printer 211 to produce a copy of the document image (S1104).

By controlling copying operation on the basis of a plurality of key objects in this manner, a document image containing the first object designated by the user can be printed on tab paper, and a character associated with the second object designated by the user can be printed on the tab. In other words, a specific document page can be picked up from many document pages, and copied on specialty paper. Note that if the user does not designate the second object, a next character of the first object is an object to be printed on the tab.

According to the above description, one character following the second key object, excluding a blank character, is extracted. However, any information associated with (attached to) a key object can be extracted, e.g., a character or character string following the first or second key object or a combination of characters or character strings following the first and second key objects. Alternatively, extracted information may be the first or second key object itself or data obtained by processing it. The print position of the extracted information is not limited to the tab of specialty paper, and may be the header, hooter, or a marginal portion of a print sheet having a general shape.

In addition, in place of information associated with the second key object, information representing an authenticated individual name or department name which has been described in the second embodiment can be combined with an image containing the first key object and printed.

Furthermore, although characters such as "Author" and "Alice" have been exemplified as key objects in the first to third embodiments, it is obvious that graphic patterns and photographs can be used as key objects. In this case, a feature is extracted from a graphic pattern or photograph, and is used for comparison in step S504.

Modification

The program executed by the CPU 201 which has been described in each embodiment may be installed outside the MFP. In this case, this program is loaded from a storage medium such as a CD-ROM or memory card into the controller 200 or loaded from an external storage device into the controller 200 through a network.

The above description has exemplified the case wherein the images read by the scanner 212 are processed. However, image data stored in a storage medium and image data acquired through a communication means can be processed in the same manner.

In addition, the means for executing image processing which has been described in each embodiment is not limited to the arrangement shown in FIG. 2, and various kinds of means such as a dedicated image processing apparatus and a general-purpose computer can be used.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2005-023936, filed on Jan. 31, 2005, which is hereby incorporated by reference herein.

What is claimed is:

1. An image processing apparatus comprising:
an input section, constructed to read an original document to be copied to input a plurality of original images;
a segmentation section, constructed to perform block selection on each of the plurality of original images so that each of the plurality of original images is segmented into objects;
a display section, constructed to display the segmented objects on a monitor;
a designator, constructed to input an instruction of a user who designates an object as a first key object and an object as a second key object from the displayed objects, wherein the first key object is used to determine an original image of the plurality of original images and the second key object is used to determine a character so as to print the original image and the character on a tabbed sheet of paper;
a determiner, constructed to determine, with respect to each of the plurality of original images, whether the objects segmented from the original image include an object corresponding to the first key object;
an extractor, constructed to extract one character associated with or following the second key object included in the original image for which it is determined that the object corresponding to the first key object is included; and
a print section, constructed to print the plurality of original images to copy the original document,
wherein the print section prints the original image for which it is determined that the object corresponding to the first key object is included on the tabbed sheet of paper, and the one character associated with or following the second key object included in the original image on a tab of the tabbed sheet of paper.

2. An image processing apparatus comprising:
an input section, constructed to read an original document to be copied to input a plurality of original images;
a segmentation section, constructed to perform block selection on each of the plurality of original images so that each of the plurality of original images is segmented into objects;
a display section, constructed to display the segmented objects on a monitor;
a designator, constructed to input an instruction of a user who designates an object as a first key object and an object as a second key object from the displayed objects, wherein the first key object is used to determine an original image of the plurality of original images and the second key object is used to determine a character so as to print the original image and the character on a tabbed sheet of paper;
a determiner, constructed to determine, with respect to each of the plurality of original images, whether the objects segmented from the original image include an object corresponding to the first key object;
an extractor, constructed to extract one character associated with or following the second key object included in the original image for which it is determined that the object corresponding to the first key object is included;
a combiner, constructed to combine the original image for which it is determined that the object corresponding to the first key object is included, and the one character associated with or following the second key object included in the original image so that the one character is inserted into a position corresponding to a tab of the tabbed sheet of paper; and
a print section, constructed to print the plurality of original images to copy the original document, wherein the combined image is printed on the recording tabbed sheet of paper.

3. The apparatus according to claim 2, wherein in a case where said determiner determines that the original image does not include the object corresponding to the first key object, said combiner outputs the original image without any change to print an image corresponding to the original image by said print section.

4. The apparatus according to claim 2, wherein the extractor extracts a character except for a blank character as the one character following the second key object.

5. An image processing method comprising the steps of:
reading an original document to be copied to input a plurality of original images;
performing block selection on each of the plurality of original images so that each of the plurality of original images is segmented into objects;
displaying the segmented objects on a monitor;
inputting an instruction of a user who designates an object as a first key object and an object as a second key object from the displayed objects, wherein the first key object is used to determine an original image of the plurality of original images and the second key object is used to determine a character so as to print the original image and the character on a tabbed sheet of paper;
determining, with respect to each of the plurality of original images, whether the objects segmented from the original image include an object corresponding to the first key object;
extracting one character associated with or following the second key object included in the original image for which it is determined that the object corresponding to the first key object is included; and
printing the plurality of original images to copy the original document,
wherein in the printing step, the original image for which it is determined that the object corresponding to the first key object is included is printed on the tabbed sheet of paper, and the one character associated with or following the second key object included in the original image is printed on a tab of the tabbed sheet of paper.

6. An image processing method comprising the steps of:
reading an original document to be copied to input a plurality of original images into a memory of an image processing apparatus;
using the image processing apparatus to perform block selection on each of the plurality of original images so that each of the plurality of original images is segmented into objects;
displaying the segmented objects on a monitor;
inputting an instruction of a user who designates an object as a first key object and an object as a second key object from the displayed objects, wherein the first key object is used to determine an original image of the plurality of original images and the second key object is used to determine a character so as to print the original image and the character on a tabbed sheet of paper;
determining, with respect to each of the plurality of original images, whether the objects segmented from the original image include an object corresponding to the first key object;
extracting one character associated with or following the second key object included in the original image for which it is determined that the object corresponding to the first key object is included;
combining the original image for which it is determined that the object corresponding to the first key object is included, and the one character associated with or following the second key object included in the original image so that the one character is inserted into a position corresponding to a tab of the tabbed sheet of paper; and
printing the plurality of original images to copy the original document, wherein the combined image is printed on the tabbed sheet of paper.

7. A non-transitory computer-readable medium retrievably storing a computer-executable program for causing a computer to perform an image processing method, the method comprising the steps of:
reading an original document to be copied to input a plurality of original images;
performing block selection on each of the plurality of original images so that each of the plurality of original images is segmented into objects;
displaying the segmented objects on a monitor;
inputting an instruction of a user who designates an object as a first key object and an object as a second key object from the displayed objects, wherein the first key object is used to determine an original image of the plurality of original images and the second key object is used to determine a character so as to print the original image and the character on a tabbed sheet of paper;
determining, with respect to each of the plurality of original images, whether the objects segmented from the original image include an object corresponding to the first key object;
extracting one character associated with or following the second key object included in the original image for which it is determined that the object corresponding to the first key object is included; and
printing the plurality of original images to copy the original document,
wherein in the printing step, the original image for which it is determined that the object corresponding to the first key object is included is printed on the tabbed sheet of paper, and the one character associated with or following the second key object included in the original image is printed on a tab of the tabbed sheet of paper.

8. A non-transitory computer-readable medium retrievably storing a computer-executable program for causing a computer to perform an image processing method, the method comprising the steps of:
reading an original document to be copied to input a plurality of original images; performing block selection on each of the plurality of original images so that each of the plurality of original images is segmented into objects;
displaying the segmented objects on a monitor;
inputting an instruction of a user who designates an object as a first key object and an object as a second key object from the displayed objects, wherein the first key object is used to determine an original image of the plurality of original images and the second key object is used to determine a character so as to print the original image and the character on a tabbed sheet of paper;
determining, with respect to each of the plurality of original images, whether the objects segmented from the original image include an object corresponding to the first key object;
extracting one character associated with or following the second key object included in the original image for which it is determined that the object corresponding to the first key object is included;
combining the original image for which it is determined that the object corresponding to the first key object is included, and the one character associated with or following the second key object included in the original image so that the one character is inserted into a position corresponding to a tab of the tabbed sheet of paper; and
printing the plurality of original images to copy the original document, wherein the combined image is printed on the tabbed sheet of paper.

* * * * *